Patented Sept. 9, 1924.

1,507,891

UNITED STATES PATENT OFFICE.

CHARLES D. PARKS, OF DANBURY, CONNECTICUT.

COMPOSITION OF MATTER FOR CARROTING FUR AND THE LIKE.

No Drawing.    Application filed June 30, 1923.   Serial No. 648,849.

*To all whom it may concern:*

Be it known that I, CHARLES D. PARKS, a citizen of the United States, and a resident of Danbury, in the county of Fairfield, State of Connecticut, have invented an Improvement in Composition of Matter for Carroting Fur and the like, of which the following is a specification.

This invention relates to composition of matter and with regard to its more specific features to compositions of matter adapted for use in the treatment of fur or other material having similar properties to give the fur or like material felting properties.

One of the objects of the invention is to provide a composition of matter suitable for the treatment of fur or the like and adapted to affect the same so as to bring about certain desired changes in the properties thereof. Another object is to provide a composition of matter adapted upon its application to fur or the like to affect the fur in a predetermined desired manner and without certain undesirable consequences. Another object is to provide a composition of matter of the above general nature capable of giving to the fur or the like in a highly efficient and satisfactory manner certain properties desired for felting. Other objects will be in part obvious or in part pointed out hereinafter.

The invention accordingly consists in the features of composition and combinations of elements, all as will be illustratively described herein and the scope of the application of which will be indicated in the following claims.

As conducive to a clear understanding of the several features of this invention, it may be here noted that the subject matter of this invention deals with compositions of matter adapted for the treatment of fur or other material in preparation particularly for the manufacture of felt therefrom, as for example the manufacture of felt hats. Fur as it comes from the animal is ordinarily not suitable for felt manufacture without being subjected to a preliminary treatment and the broad idea of such treatment is ordinarily known as carroting. The formation of felt from fur or the like is brought about by the individual fibres, in contact with each other, interlocking and it is to facilitate this interlocking action of the fur fibres that the carroting process is necessary. The natural fur has associated therewith a certain amount of grease or gummy substance and other foreign material, which for the sake of convenience and clarity will be hereinafter generally referred to as wax. In order that the fur may have the desired felting properties, it is important that this wax be substantially removed from the fur or so changed as to be readily soluble during the felting process. The surface of a fur fibre, as is commonly known, is coated with a layer of overlying scales or barbs and the removal of the wax from the fur loosens or releases these barbs to some extent. When thus released, they take a large part in the interlocking action of the fibres to form felt.

A material generally employed at the present time for carroting fur is mercuric nitrate, prepared from nitric acid and mercury. This material, on account of its poisonous character, is decidedly objectionable and possesses many further practical disadvantages. In the manufacture of felt, the fur is continually handled throughout the different stages of manufacture, and even when the fur is dry, poisonous acid fumes are given off by the nitrate of mercury, which are extremely prejudicial to the health of workmen. Furthermore, particularly in the manufacture of hats, the felt is repeatedly treated in boiling hot water, thus expediting the release of the objectionable fumes from the poisonous carroting substance. In addition to the objectionable poisonous character of the mercuric nitrate, the strong acid mixture is apt to detrimentally affect the fur by roughening or partially disintegrating the fibres. The provision of carroting material which will dependably and efficiently prepare fur or the like for felting, which is not poisonous, which avoids many other disadvantages attendant upon the mercuric nitrate treatment and which attains advantages not realized by such treatment is among the dominant aims of this invention.

This invention contemplates the use, preferably, of a non-acid agent as a carroting substance and best results are gained with an alkaline rather than a neutral material. The carroting material is most conveniently applied to the fur in the form of a solution and in this manner the best results are obtained in that a solution may readily reach all the fibres of the fur and a regular, uniform treatment of all parts thereof is had.

The preferred form of carroting substance embodied in this invention comprises a solution of a mixture of a cleansing agent and an oxidizing agent. The cleansing agent is preferably hydroxide of sodium but hydroxides of other elements of the alkali metal family, such as hydroxide of potassium may also be used with good results. The oxidizing agent preferably employed is hydrogen peroxide. Sodium hydroxide is an excellent cleansing agent having a corrosive action upon many animal and vegetable substances and is very soluble in water. Hydrogen peroxide is a strong oxidizing agent also readily soluble in water. The strength of the solutions preferably employed will be more fully set forth hereinafter.

The preferred forms of carroting solutions just described are prepared preferably from a peroxide of the element forming the hydroxide cleansing agent by mixing the peroxide with water. Peroxide of sodium is supplied commercially in the form of a yellowish white powder which is decomposed by water, forming sodium hydroxide and hydrogen peroxide. In forming the solution, it is desirable to start with an ample volume of water and sift the peroxide slowly thereinto, stirring the mixture in order to keep the temperature down. The reaction of the peroxide with the water generates considerable heat and the temperature should be kept down to about 55° F. or less. When the desired strength of the solution is obtained by thus gradually adding the sodium peroxide to the water, the solution is ready for application to the fur or hair as a carroting material.

The usual method of applying the carroting solution to the fur is to brush it into the fur while the latter is still on the skin. The fur is then dried and thereafter may be removed from the skin as usual and made into felt. It may be here noted that the expression " fur having felting properties " is to be interpreted as indicating fur which has such qualities that when subjected to an ordinary felt making process it will felt. The fur may be removed from the skin before the carroting process and the carroting material may be applied thereafter, and according to this latter method the loose fur is simply immersed in the carroting solution and then dried. In the first mentioned method, namely that of brushing the solution into the fur on the skin, a far stronger solution of the carroting material is required than in the second method, wherein the loose fur is immersed in the solution. When using the solution by brushing it into the fur on the skin, the strength of the solution may vary between the approximate limits of 1° Baumé and 10° Baumé. However it is found that best results are better assured if the strength of the solution is kept within the limits of 2½° Baumé and 7° Baumé. The strength of solution to give the best results may, however, vary with the type and quality of the fur being carroted, it being found that with certain grades of fur a solution having a strength of about 6° Baumé gives the best results. To give a solution having a strength of about 6° Baumé, approximately 1 pound of sodium peroxide is dissolved in 3 gallons of water. If the strength of the solution is too high, the fur will be injured and if the strength of the solution is too low, the desired results will not be achieved. When treating the fur detached from the skin, that is by immersing the loose fur in the solution, it is found that the strength of the solution may vary approximately from 1 pound of sodium peroxide in 300 gallons of water up to 6 pounds in 300 gallons of water. In this latter method, however, the preferred proportions are 2 pounds of sodium peroxide in 300 gallons of water, it being found that the solution resulting from such proportions gives the best results when treating the fur after being detached from the skin. A probable reason for the relative weakness of solution needed for carroting the detached fur is that the solution has an opportunity to work its way inside the fibres of the fur whereas in the treatment of the fur before removal from the skin no such opportunity is afforded.

Fur or the like treated as above described has substantially all the wax or gummy substance removed by being made soluble and absorbent of water and then washed out. The carroting material is non-poisonous and non-acid having an alkaline reaction and the treated fur being free from all poisonous material is far more suitable and healthful from the standpoint of workmen who come into contact with it during the manufacture of felt therefrom than is fur treated by the usual nitrate of mercury process and impregnated with the poisonous nitrate. Furthermore an alkaline fur is far better suited for dyeing than is an acid fur as it takes the dye much easier. Acids are employed to set the dyes and in order to have uniform results, it is desirable that the dye should be evenly spread over the fur before any acid is applied thereto. It will readily be seen that an alkaline fur is particularly adapted for this purpose, namely that of dyeing not only on account of the absence of acid but on account of its neutralizing effect on any acid in the dyes. In addition the carroting solutions of this invention enable the dyer to obtain lighter shades in the dyed fur as the carroting material has a bleaching or lightening action on the fur.

In the manufacture of felt hats, it is common practice, of course, to mix with the good quality felting fur or fleece fur as it is called, a proportion of fur which felts little if at all, thus reducing the price of the fur required for a hat and in some respects improving the hat. The amount of this cheaper fur or filler fur, as it is called, which can be used is, of course, limited. When the fleece fur, as well as the cheaper filler fur, is treated with the carroting material of this invention, it is found that due to the superiority of the felting action attained, a much larger proportion of the filler fur may be employed than is possible when the old acid carroting material is employed.

From the above it will be readily seen that there is herein provided a composition of matter which attains the objects of this invention and in so doing renders possible the realization of many distinct practical advantages. Furthermore, the art of preparing the new material is one which may be efficiently carried on in a practical commercial manner.

As various possible embodiments might be made of the above invention and as the embodiments above set forth might be varied in various ways all without departing from the scope of the invention, it is to be understood that all matter herein set forth is to be interpreted as illustrative and not in a limiting sense.

I claim as my invention:

1. As a new composition of matter adapted for the carroting of fur and the like, an aqueous solution comprising sodium peroxide dissolved in water in the proportion of approximately one pound of sodium peroxide to three gallons of water.

2. As a new composition of matter adapted for the carroting of fur and the like, an aqueous solution of sodium hydroxide and hydrogen peroxide of not greater than 10 degrees Baumé and not less than 1 degree Baumé for giving the fur felting properties.

3. As a new composition of matter adapted for the carroting of fur and the like, an aqueous solution of sodium hydroxide and hydrogen peroxide of a strength between the limits of 2½ degree Baumé and 7 degree Baumé for giving the fur felting properties.

In testimony whereof, I have signed my name to this specification this 22nd day of June 1923.

CHARLES D. PARKS.